US012760559B2

(12) United States Patent
Li et al.

(10) Patent No.: US 12,760,559 B2
(45) Date of Patent: Oct. 13, 2026

(54) CONTROL METHOD FOR LOCKING AND UNLOCKING LOCKS

(71) Applicant: Anker Innovations Technology Co., Ltd., Changsha (CN)

(72) Inventors: Junnan Li, Shenzhen (CN); Da Liang, Shenzhen (CN); Liying Chen, Shenzhen (CN); Yixi Peng, Shenzhen (CN); Dezhou Chang, Shenzhen (CN); Ping Liu, Shenzhen (CN); Dejun Liu, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 57 days.

(21) Appl. No.: 18/599,598

(22) Filed: Mar. 8, 2024

(65) Prior Publication Data

US 2024/0301719 A1 Sep. 12, 2024

(30) Foreign Application Priority Data

Mar. 10, 2023 (CN) ......................... 202310231051.4

(51) Int. Cl.
*E05B 47/00* (2006.01)

(52) U.S. Cl.
CPC .. *E05B 47/0001* (2013.01); *E05B 2047/0014* (2013.01); *E05B 2047/005* (2013.01);
(Continued)

(58) Field of Classification Search
CPC ......... E05B 47/0001; E05B 2047/0014; E05B 2047/005; E05B 2047/0069; E05B 2047/0097
See application file for complete search history.

(56) References Cited

U.S. PATENT DOCUMENTS 6,967,562 B2 * 11/2005 Menard .................... E05B 47/00 70/222
11,072,945 B2 * 7/2021 Johnson ................. G08B 13/08
(Continued)

FOREIGN PATENT DOCUMENTS

CN 109505457 A 3/2019
CN 211201445 U 8/2020
(Continued)

OTHER PUBLICATIONS

May 23, 2026—(CN) First Office Action—App. No. 202310231981. X—Eng. Trans.
(Continued)

*Primary Examiner* — Mark A Williams
(74) *Attorney, Agent, or Firm* — Banner & Witcoff, Ltd.

(57) ABSTRACT

This disclosure provides a lock having a rotating component, the rotation of which drives the retractable movement of a latch bolt, and the rotating component is equipped with a trigger component; a first sensing component, fixedly set or arranged at the first position of the lock, where the first position is the position indicated by a knob fixedly connected to the rotating component when the lock is in the unlocked state, and when the trigger component is at the first position, the first sensing component generates a first trigger signal; a second sensing component is fixedly set or arranged at the second position of the lock, where the second position is the position indicated by the knob when the lock is in the locked state, and when the trigger component is at the second position, the second sensing component generates a second trigger signal.

20 Claims, 6 Drawing Sheets

(52) U.S. Cl.
CPC ................. *E05B 2047/0069* (2013.01); *E05B 2047/0097* (2013.01)

(56) References Cited

U.S. PATENT DOCUMENTS

| | | | | |
|---|---|---|---|---|
| 11,527,121 | B2 * | 12/2022 | Johnson | G07C 9/00571 |
| 11,959,308 | B2 * | 4/2024 | Petty | E05B 47/0012 |
| 12,180,750 | B2 * | 12/2024 | Abueshsheikh | G07C 9/00309 |
| 12,385,286 | B2 * | 8/2025 | Kusanale | E05B 47/0012 |
| 2004/0066046 | A1 * | 4/2004 | Becken | E05B 63/20 292/39 |
| 2015/0097380 | A1 * | 4/2015 | Nye-Hingston | E05B 47/023 292/201 |
| 2016/0258189 | A1 | 9/2016 | Frolov | |
| 2017/0342740 | A1 | 11/2017 | Basavaraju et al. | |

FOREIGN PATENT DOCUMENTS

| | | | |
|---|---|---|---|
| CN | 111663853 | A | 9/2020 |
| CN | 109184368 | B | 10/2020 |
| CN | 211691893 | U | 10/2020 |
| CN | 214835488 | U | 11/2021 |
| CN | 114856320 | A | 8/2022 |
| CN | 217950038 | U | 12/2022 |
| GB | 2589403 | A | 6/2021 |
| JP | H02144481 | A | 6/1990 |
| JP | 2009203653 | A | 9/2009 |
| JP | 2009281007 | A | 12/2009 |
| JP | 2011026813 | A | 2/2011 |
| JP | 2016075138 | A | 5/2016 |
| WO | 2020083192 | A1 | 4/2020 |
| WO | 2021023276 | A1 | 2/2021 |

OTHER PUBLICATIONS

May 28, 2026—(CN) First Office Action—App. No. 202310231051.4—Eng. Trans.

* cited by examiner

CONTROL METHOD FOR LOCKING AND UNLOCKING LOCKS

CROSS-REFERENCE TO RELATED APPLICATION

The present application claims priority to CN Application No. 202310231051.4, filed on Mar. 10, 2023. The above application is incorporated by reference in its entirety.

FIELD OF USE

This application relates to the field of lock technology, particularly to a type of lock and a control method for locking and unlocking the lock.

BACKGROUND

In today's era of smart technology, various traditional products are increasingly transitioning into the digital phase. In the smart lock industry, as digitalization continues to advance, various new smart technologies are constantly being integrated, increasing the level of automation of locks. Specifically, when smart locks perform electronic locking and unlocking operations (non-manual operations), a controller needs to determine whether the lock is currently in a fully unlocked state or a fully locked state, and then control the rotation direction of the motor based on the current state of the lock. However, there is a lack of accurate and convenient solutions for detecting whether a lock is fully unlocked or locked state in the related technologies.

It should be noted that the information disclosed in the aforementioned background technology section is only used to enhance the understanding of the background of this specification. Therefore, it may include information that does not constitute existing technology known to those of ordinary skill in the art.

SUMMARY

This specification provides a lock and a method for controlling the locking and unlocking mechanisms of the lock, which can accurately and conveniently detect whether the lock is in the fully locked or unlocked state.

Other characteristics and advantages of this specification will become apparent through the detailed description below, or be acquired in part through the practice of this specification.

According to one aspect of this specification, a lock includes a rotating component, the rotation of which drives the retractable movement of a latch bolt, and a triggering component set on the rotating component. The lock includes a first sensing component, fixedly set or arranged at a first position of the lock, the first position being the position pointed to by the knob, which in turn is fixedly connected to the rotating component when the lock is in the unlocked state. The first sensing component generates a first trigger signal when the triggering component is at the first position. The lock further includes a second sensing component, fixedly set or arranged at a second position of the lock, the second position being a position pointed to by the knob when the lock is in the locked state. The second sensing component generates a second trigger signal when the triggering component is at the second position.

In some examples, based on the aforementioned scheme, the lock further includes a third sensing component fixedly installed or arranged at a third position of the lock, the third position being located between the first position and the second position. The third sensing component sends a detection signal to a control component of the lock when the third sensing component senses the trigger component.

In some examples, based on the aforementioned scheme, the control component (e.g., a controller) performs an unlocking action or a locking action based on the detection signal. The control component switches from a low power mode to a working mode based on the detection signal, where in the low power mode, components of the lock that are in a dormant or sleep state are not powered; and in the working mode, components of the lock that are in a dormant or sleep state are powered.

In some examples, based on the aforementioned scheme, the first sensing component and the second sensing component comprise photoelectric sensors, and the trigger component comprises a light-blocking piece; the third sensing component comprises a Hall sensor, and the trigger component includes a magnetic piece.

In some examples, based on the aforementioned scheme, the lock further includes a drive component. The drive component is connected to the rotating component, and the drive component is also electrically connected to the controller (e.g., the control component).

In some examples, the controller is configured to detect the rotation of the rotating component. The controller is further configured to receive, from the first sensing component, the first trigger signal, and receive, from the second sensing component, the second trigger signal. After receiving the first trigger signal, the controller generates an unlock completion signal, and controls the rotating component to continue rotating a preset angle. The preset angle is determined by a compensation strategy. After receiving the second trigger signal, the controller generates a lock completion signal, and controls the rotating component to continue rotating the preset angle.

In some examples, based on the aforementioned scheme, the controller is further configured to control the rotating component to rotate towards the second position after receiving, from a terminal, a reminder message of a pending lock status, wherein the reminder message is generated based on determining that the position of the rotating component is neither at the first position nor at the second position and the duration of stay is greater than a preset duration.

In some examples, based on the aforementioned scheme, during the rotation of the rotating component and after receiving, from the third sensing component, the detection signal, the controller is configured to cause the rotating component to rotate towards the first position and to point to the first position to perform an unlocking action. During the rotation of the rotating component and after receiving the detection signal, the controller is further configured to control the rotating component to continue rotating towards the second position and to point to the second position to perform the locking action.

In some examples, based on the aforementioned scheme, after determining that the driving component is not activated, and in response to receiving a detection signal from the third sensing component, the controller is further configured to switch the lock from a low-power mode to a working mode. In the low-power mode, components of the lock in a sleep state are not powered; and in the working mode, the components in a sleep state are powered.

In some examples, based on the aforementioned scheme, after generating the unlock completion signal and controlling the rotating component to continue rotating the preset angle, the controller is further configured to send a first notification to the terminal, and the first notification indicates a successful unlocking of the lock. After generating the lock completion signal and controlling the rotating component to continue rotating the preset angle, the controller is further configured to send a second notification to the terminal, and the second notification indicates a successful locking of the lock.

In some examples, a method for controlling locking and unlocking mechanisms of a lock is provided. The lock includes a controller, a rotating component comprising a triggering component, a first sensing component and a second sensing component. The method includes: receiving, by the controller, a first triggering signal or a second triggering signal, wherein the first triggering signal is generated by the first sensing component when the triggering component is in a first position, and the second triggering signal is generated by the second sensing component when the triggering component is in a second position; based on the receipt of the first triggering signal, generating a lock opening completion signal, wherein the rotating component is configured to continue rotating a preset angle, wherein the preset angle is determined by a compensation strategy; and based on the receipt of the second triggering signal, generating a lock closing completion signal, wherein the rotating component is configured to continue rotating the preset angle.

In some examples, the lock further includes a third sensing component fixedly arranged at a third position of the lock, the third position being between the first position and the second position. The method further includes: receiving, by the controller and from a terminal, a reminder message that a status of the lock is pending; determining that the rotating component is neither at the first position nor at the second position, and a duration of stay of the rotating component is greater than a preset duration; and causing the rotating component to rotate towards the second position.

In some examples, the controller receives, from the third sensing component, a detection signal indicating that the third sensing component senses the triggering component at the third position. During the rotation of the rotating component and after receiving the detection signal, the controller causes the rotating component to rotate towards the first position and to point to the first position to perform an unlocking action. Alternatively, during the rotation of the rotating component and after receiving the detection signal, the controller causes the rotating component to rotate towards the second position and to point to the second position to perform a locking action. Still alternatively, after receiving the detection signal indicating that the third sensing component senses the triggering component at the third position, the controller causes the lock to switch from a low power mode to a working mode. In the low power mode, one or more components of the lock in a sleep state are not powered, and in the working mode, the one or more components in the sleep state are powered. In some examples, the lock further comprises a driving component connected to the rotating component, and the driving component is also electrically connected to the controller.

In some examples, after generating the lock opening completion signal and causing the rotating component to continue rotating the preset angle, the controller sends a first notification to a terminal, and the first notification indicates a successful unlocking. Alternatively, after generating the lock closing completion signal and causing the rotating component to continue rotating the preset angle, the controller sends a second notification a terminal, and the second notification indicates a successful locking.

In some examples, the lock is in an unlocked state when the triggering component is at the first position, and the lock is in a locked state when the triggering component is at the second position. The first sensing component and the second sensing component comprise photoelectric sensors, the triggering component comprises a light-blocking piece, the third sensing component comprises a Hall sensor, and the triggering component includes a magnetic piece.

According to another aspect of this specification, a computer-readable storage medium is provided, which stores a computer program that, when executed by the processor, implements the control method for locking and unlocking the lock as described in the examples of this disclosure.

The lock and the control method for locking and unlocking provided in the examples of this disclosure have the following technical effects:

The examples of this disclosure provide a lock that includes a first sensing component, a second sensing component and a rotating component comprising a triggering component. The first sensing component is fixedly arranged at a first position of the lock, where the first position is a position towards which the rotating component points to when the lock is in the unlocked state. For example, a knob is fixedly connected to the rotating component and the knob points to the first position when the lock is in an unlocked state. Thus, when a trigger component set on the rotating component rotates to the first position during its rotation, the first sensing component will generate a first trigger signal. The second sensing component is fixedly located at the second position of the lock, where the second position is the position towards which the rotating component points when the lock is in the locked state. For example, the knob points to the second position when the lock is in a locked state. Thus, when the trigger component set on the rotating component rotates to the second position during its rotation, the second sensing component will generate a second trigger signal. Therefore, based on the aforementioned first trigger signal, it is possible to accurately and conveniently detect when the lock is properly unlocked, and likewise, based on the aforementioned second trigger signal, it is possible to accurately and conveniently detect when the lock is properly locked.

It should be understood that the above general description and the detailed description to follow are only exemplary and explanatory and should not limit this specification.

BRIEF DESCRIPTION OF THE DRAWINGS

The accompanying drawings are incorporated into the specification as part of the description of the examples of the present disclosure and are used in conjunction with the specification to explain the principles of the present disclosure. It is apparent that the drawings described below are only some examples of the present disclosure, and for those of ordinary skill in the art, other drawings can be obtained based on these drawings without creative efforts.

DETAILED DESCRIPTION

Figure 1:
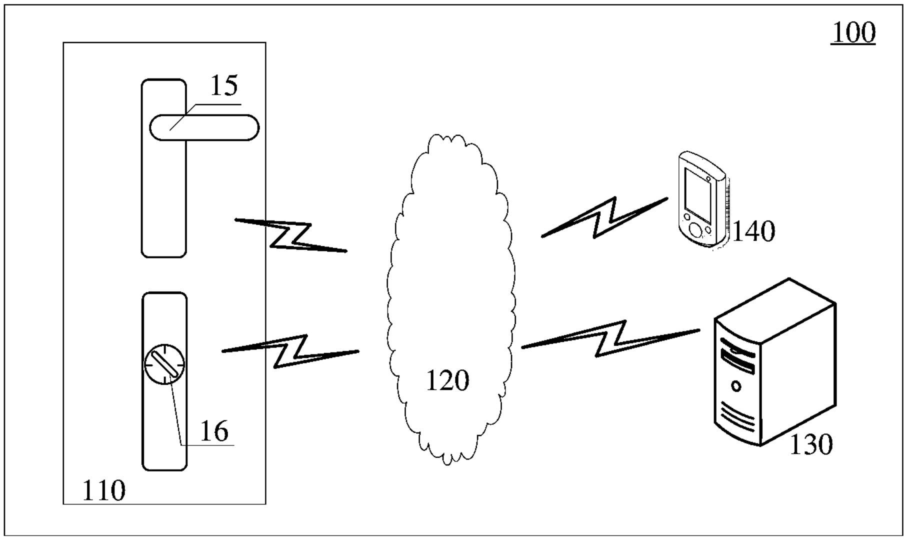
FIG. 1 is a schematic diagram of the system architecture for a lock control scheme provided by an example of the present disclosure.

To make the objectives, technical solutions, and advantages of this specification clearer, the examples of this specification will be further described in detail in conjunction with the accompanying drawings.

When the following description refers to the drawings, unless otherwise indicated, the same numbers in different drawings represent the same or similar elements. The examples described in the following examples do not represent all examples consistent with this specification. Instead, they are merely examples of devices and methods consistent with some aspects of this specification as detailed in the accompanying claims.

Now, a more comprehensive description of the example examples will be provided with reference to the accompanying drawings. However, it should be understood that the examples can be implemented in many different forms and should not be construed as limited to the examples set forth herein; rather, these examples are provided so that this disclosure will be thorough and complete, and will fully convey the concept of the examples to those skilled in the art. The described features, structures, or characteristics may be combined in any suitable manner in one or more examples. In the following description, numerous specific details are provided to give a thorough understanding of examples of the description. However, it will be apparent to one skilled in the art that one or more of the specific details can be omitted or that other methods, components, devices, steps, etc., can be used. In other instances, well-known technical solutions are not shown or described in detail to avoid obscuring aspects of the description.

Furthermore, the drawings are only schematic illustrations of the description and are not necessarily drawn to scale. The same reference numerals in the drawings indicate the same or similar parts, and thus their description will be omitted. Some of the block diagrams shown in the drawings are functional entities and do not necessarily correspond to physically or logically independent entities. These functional entities can be implemented in software, or realized in one or more hardware modules or integrated circuits, or implemented across different networks and/or processor devices and/or microcontroller devices.

This specification example can solve the technical problems existing in the related technology. Specifically, this specification example provides the following contents:

For example, FIG. 1 is a schematic diagram of the system architecture of the control scheme for locking and unlocking provided by the examples of this specification.

As shown in FIG. 1, the system architecture 100 may comprise a lock 110, a network 120, and a server 130 or a terminal 140. The lock 110 can be connected to the server 130/terminal 140 through the network 120.

For example, the network 120 can be a communication medium of various connection types that can provide a communication link between the terminal 110 and the server 130, such as a wired communication link, a wireless communication link, or an optical fiber cable, etc., which is not limited in this specification. The server 130 can be an independent physical server, or it can be a server cluster or distributed system composed of multiple physical servers, or it can be a cloud server that provides basic cloud computing services such as cloud services, cloud databases, cloud computing, cloud functions, cloud storage, network services, cloud communications, middleware services, domain name services, security services, as well as big data and artificial intelligence platforms. The terminal 140 can be a mobile phone, computer, tablet, etc., that includes a camera component or video playback function.

For example, the lock 110 can be a fingerprint lock, a password lock, and locks based on terminal applications, etc. Under the intelligent lock switching mode (such as switching locks through fingerprints, remote switching locks based on applications, switching locks through passwords), it adopts the method of driving by a driving component (such as a motor) 11 to achieve locking/unlocking. At the same time, it can also realize manual locking/unlocking through a door handle 15, a knob 16, etc., and the manual locking/unlocking mode does not require the driving of the driving component 11.

Figure 2:
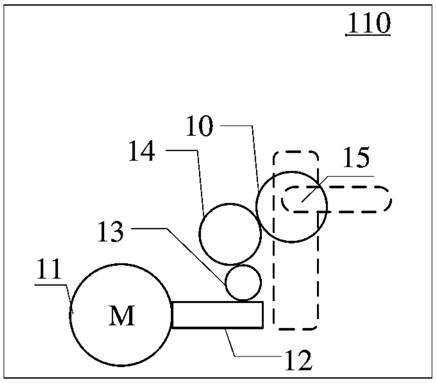
FIG. 2 is a schematic diagram of the structure of a lock provided by an example of the present disclosure.
Figure 3:
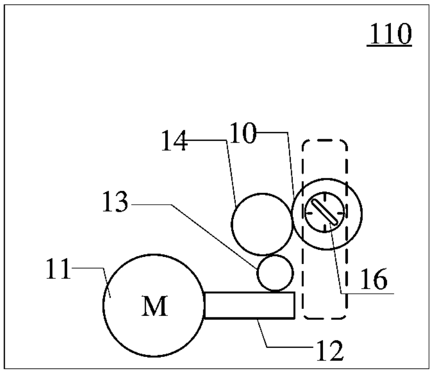
FIG. 3 is a schematic diagram of the structure of a lock provided by another example of the present disclosure.

In an example, the working principle of the lock in the intelligent lock switching mode is introduced through FIGS. 2 and 3. The difference between FIG. 2 and FIG. 3 lies in the different external forms of the lock: FIG. 2 shows the external form as a door handle 15, while FIG. 3 shows the external form as a knob 16, but the internal working principle of the lock remains the same. Specifically, in the intelligent lock switching mode, when the driving component 11 rotates, its transmission 12 drives the lock's active gear 13 to rotate, which in turn drives the second gear 14 to rotate, and the second gear 14 then drives the rotating component 10 to rotate. The rotation of the rotating component 10 drives the movement of the lock bolt, thus achieving intelligent lock switching. Specifically, the driving component 11 is also electrically connected to the control component (e.g., the lock's controller, not shown in FIGS. 2 and 3), so that in the case of intelligent locking, the controller sends a locking command to the aforementioned driving component, and when the driving component 11 rotates forward, it can extend the lock bolt through the aforementioned components, thus achieving intelligent locking. In the case of intelligent unlocking, the controller sends an unlocking command to the aforementioned driving component, and when the driving component 11 rotates in reverse, it can retract the lock bolt through the aforementioned components, thus achieving intelligent unlocking.

It should be noted that the rotating component 10 is connected to the external components on the outside of the lock (such as the door handle 15, the knob 16), so that in the manual lock switching mode, when a user acts on the external components on the outside of the lock, it can also drive the rotating component 10 to rotate, thereby achieving the movement of the lock bolt and ultimately realizing manual lock switching.

Figure 4:
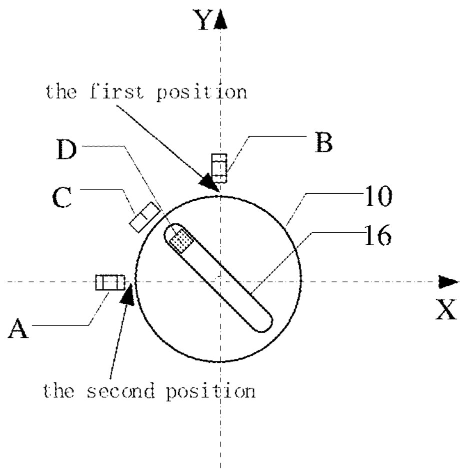
FIG. 4 is a schematic diagram of the sensor installation position provided by an example of the present disclosure.
Figure 5:
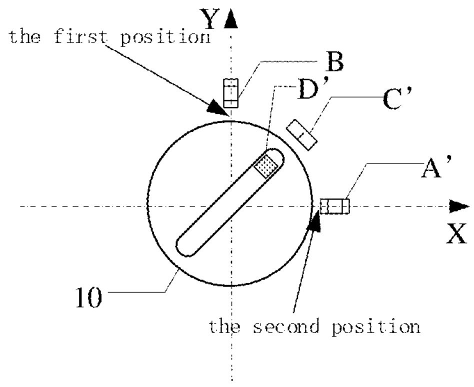
FIG. 5 is a schematic diagram of the sensor installation position provided by another example of the present disclosure.
Figure 6:
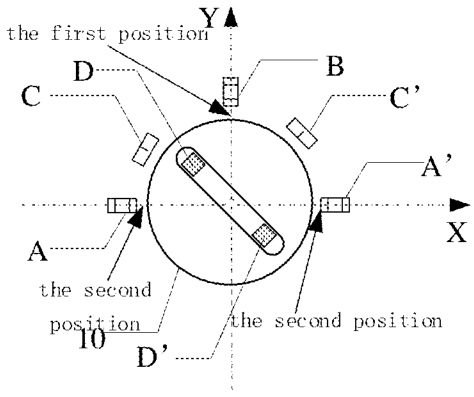
FIG. 6 is a schematic diagram of the sensor installation position provided by yet another example of the present disclosure.

In the examples, FIGS. 4 to 6 illustrate schematic diagrams of the installation positions of the sensing components in the lock provided by the examples of this specification. In the locks provided by the examples shown in FIGS. 4 to 6, both sensing components and triggering components are set up. It can be understood that the first sensing component and the second sensing component can be fixedly installed or arranged on the inside of the lock housing, specifically on the circuit board of the lock. It can be understood that the circuit board is relatively stationary with respect to the lock housing and does not rotate according to the rotation of the driving component or the transmission component. The specific installation positions of the above-mentioned sensing components will be introduced in detail in the following examples.

Since the door opening method can be divided into left-opening and right-opening, the example shown in FIG. 4 can be applied to the right-opening door method. Specifically, the first sensing component B and the second sensing component A are set at the "first position" and "second position," respectively; the example shown in FIG. 5 can be applied to the left-opening door method. Specifically, the first sensing component B and the second sensing component A' are set at the "first position" and "second position," respectively; the example shown in FIG. 6 can be applied to both right-opening and left-opening door methods. Specifically, the first sensing component B is set at the "first position." The two "second positions" are respectively equipped with the first sensing components A and A'. Here, the above-mentioned "first position" refers to the position pointed to by the knob 16, which is fixedly connected to the rotating component 10 when the lock is in the unlocked state, and the above-mentioned "second position" refers to the position pointed to by the knob 16, which is fixedly connected to the rotating component 10 when the lock is in the locked state. It can be understood that, in the case where the external component is a door handle 15 and the unlocking method is pressing down to unlock, the above-mentioned "first position" corresponds to the state where the door handle 15 is pressed down, and the above-mentioned "second position" corresponds to the state where the door handle 15 naturally springs up. The following examples will temporarily take the scheme shown in FIG. 4 as an example for introduction.

In the examples, the aforementioned first sensing component and second sensing component can include photoelectric sensors or Hall sensors. In the examples of this specification, the first sensing component and the second sensing component can include photoelectric sensors. Using photoelectric sensors to detect the position of the rotating component has high accuracy for position detection and good consistency in triggering signals at the same angle. In the case where both the first sensing component and the second sensing component include photoelectric sensors, the triggering component includes a light-blocking piece, that is, the material of the triggering component is capable of blocking light.

Figure 7:
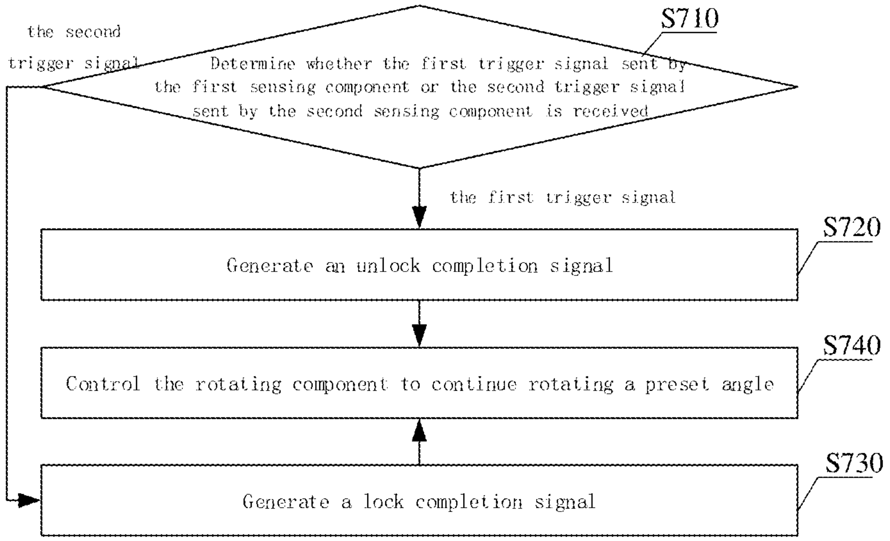
FIG. 7 is a flowchart illustrating a method for controlling the locking and unlocking mechanisms of a lock provided by an example of the present disclosure.

For example, FIG. 7 is a flowchart illustrating a method for controlling the locking and unlocking mechanisms of a lock provided by an example of this specification. Referring to FIG. 7, the example shown includes steps S710-S740.

In S710, it is determined whether a first trigger signal sent by the first sensing component or a second trigger signal sent by the second sensing component is received.

In the example, referring to FIG. 4, the lock provided in this example is equipped with photoelectric sensors (comprising A and B) and a trigger component D, where the position of the trigger component D in the rotating component 10 corresponds to the end of the knob 16. During the unlocking and locking process with the right-handed door opening method, the rotating component 10 drives the trigger component D to rotate, and the fixed photoelectric sensors (comprising A and B) can detect the position of the trigger component D. Specifically, the photoelectric sensor B (the first sensing component) is fixedly set or arranged at the "first position" of the lock, which is the position pointed to by the knob 16 connected to the rotating component 10 when the lock is in the unlocked state. Thus, during the rotation of the rotating component 10, if the trigger component D set thereon rotates to the first position, the trigger component D will be located between the emitting pole and the receiving pole of the photoelectric sensor B, thereby blocking the light from the emitting pole, and consequently, the photoelectric sensor B (a sensing component) generates a trigger signal (i.e., the first trigger signal).

For example, referring to FIG. 7, if the above-mentioned first trigger signal is received, then execute S720: generate an unlock completion signal.

Figure 8:
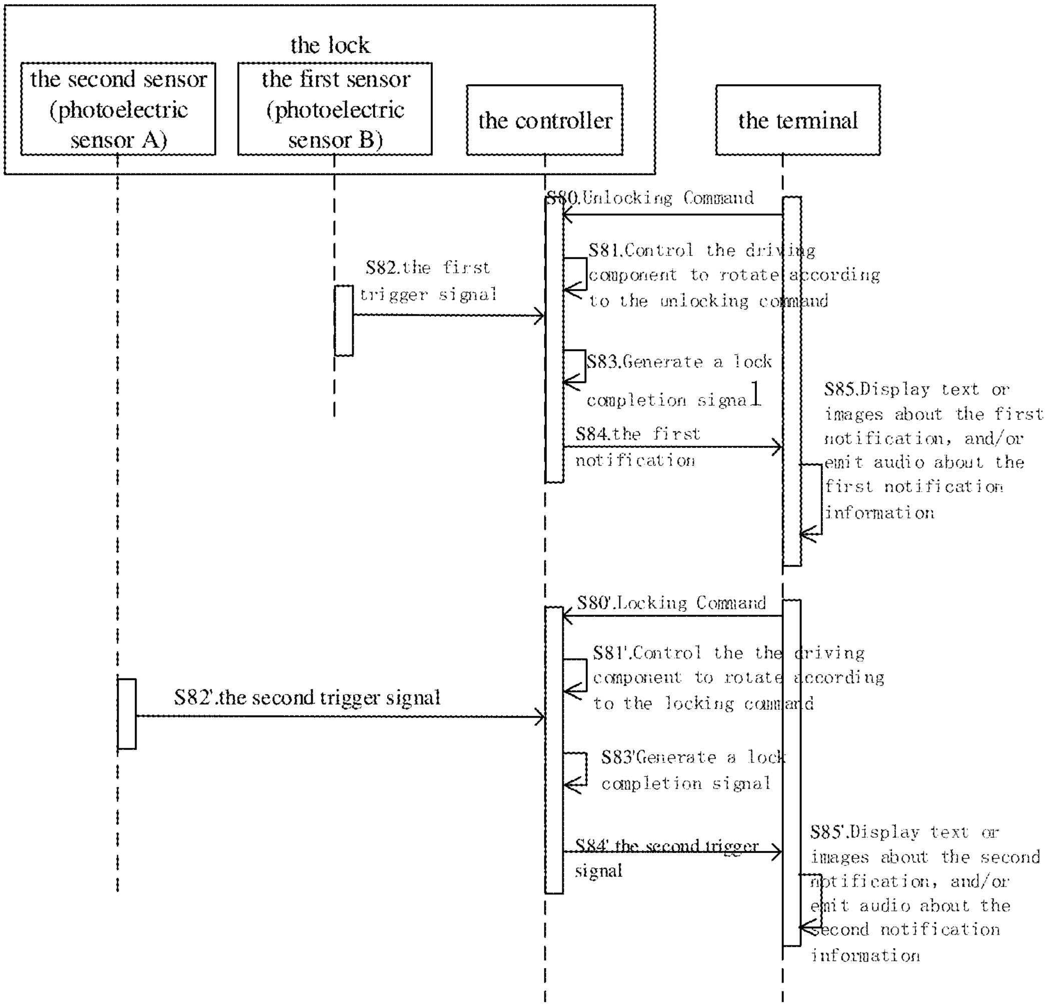
FIG. 8 is a schematic diagram of the information exchange between a lock and a terminal during the intelligent locking and unlocking process provided by an example of the present disclosure.

Specifically, referring to FIG. 8, during the process of intelligent locking and unlocking, the terminal sends an unlocking command to the lock controller (such as S80), the controller controls the driving component to perform the unlocking action according to the received unlocking command (such as S81), during the rotation of the driving component, the triggering component is able to trigger the first sensor, then if the lock controller receives the first trigger signal sent by the first sensor (i.e., photoelectric sensor B) (such as S82), the controller generates an unlocking completion signal based on the received first trigger signal (such as S83), thereby the controller determines the current state as being unlocked in place. Furthermore, the controller sends the first notification information to the terminal (such as S84). In an exemplary example, the terminal is connected to the lock via short-range communication. In another exemplary example, the terminal is equipped with application software related to the lock, and the user account logged into the application is the lock administrator, then the user can perform remote unlocking. During the remote unlocking process, the lock controller sends the above-mentioned first notification information to the user's operating terminal, so that the terminal displays text or images about the first notification, for example, the terminal displays "Unlocking successful", and may also emit a preset audio about unlocking success, etc. (such as S85), thus the remotely operating user can be sure that the unlocking has been successful.

Continuing to refer to FIG. 4, the photoelectric sensor A (the second sensing component) is fixedly set or arranged at the "second position" of the lock, the "second position" being the position pointed to by the knob 16 fixedly connected to the rotating component 10 when the lock is in the locked state, so that during the rotation of the rotating component 10, when the triggering component D set thereon rotates to the "second position", then the triggering component D is between the emitting pole and the receiving pole of the photoelectric sensor A, thereby the triggering component D is able to block the light from the emitting pole, and then the photoelectric sensor A (the second sensing component) generates a trigger signal (i.e., the second trigger signal).

For example, referring to FIG. 7, if the above-mentioned second trigger signal is received, then execute S730: Generate a lock completion signal.

Specifically, referring to FIG. 8, during the process of intelligent locking, the terminal sends a lock command (such as S80') to the lock controller, which controls the actuator to perform the locking action based on the received lock command (such as S81'). During the rotation of the actuator, if a component can trigger the second sensor, then the lock controller receives the second trigger signal sent by the second sensor (that is, photoelectric sensor A) (such as S82'), and the controller generates a lock completion signal based on the received second trigger signal (such as S83'), thereby determining that the lock is currently in a properly locked state. Furthermore, the controller sends the second notification information to the terminal (such as S84'). In this example, the terminal and the lock are connected via short-range communication. In another example, the terminal is equipped with application software related to the lock, and when the user account logged into the application is that of the lock administrator, the user can perform remote locking. During the remote locking process, the lock controller sends the aforementioned second notification information to the user's operating terminal, so that the terminal displays text and images about the second notification, for example, the terminal displays "Locking successful", and may also emit a preset audio signal about the successful locking (such as S85'), thus allowing the remote operator to confirm that the locking has been successful. Through the above implementation example, the lock controller can accurately and conveniently detect whether the lock is properly unlocked or locked, and the user can also quickly and remotely determine the status of the lock.

In the above implementation, the checking method for whether the lock is properly unlocked or locked is realized by the fixedly set photoelectric sensor and the rotating component driving the trigger component to rotate. However, generally, if the trigger component has not fully entered the gap between the emitting end and the receiving end of the photoelectric sensor (that is, the rotating component has not rotated into position), the photoelectric sensor will generate a trigger signal. Referring to FIG. 4, if the unlocking is in place, the trigger component D should coincide with the Y-axis, but due to the aforementioned reasons, before the trigger component coincides with the Y-axis, the photoelectric sensor B has already issued the first trigger signal. Therefore, when the controller generates the unlocking completion signal, the trigger component has not actually coincided with the Y-axis (and has not truly reached the unlocked position). To address this issue, the example of this disclosure provides the following solution: that is, to execute S740: control the rotating component to continue rotating a preset angle.

As described in the above-mentioned example, when the controller generates the aforementioned unlock completion signal, there is a certain angle (generally around 5 degrees) between the trigger component and the positive direction of the Y-axis. Under this circumstance, the control driving component continues to move for a preset duration, thereby controlling the rotating component to continue rotating a preset angle, which can ensure that the trigger component is fully inserted between the emitting end and the receiving end of the photoelectric sensor, while also aligning the knob correctly to the unlock position. The preset duration for the continued movement of the control driving component can be determined according to a compensation strategy.

For example, since the rotation speed of the rotating components such as the motor and gears in the lock is related to the current battery level of the lock, in the aforementioned compensation strategy, the preset duration for the continued movement of the control driving component is related to the current battery level of the lock. Specifically, the current battery level is negatively correlated with the preset duration for the continued movement of the control driving component. That is, the higher the current battery level, the faster the rotation speed of the rotating components such as the motor and gears in the lock, and thus the shorter the time required to rotate the same angle, resulting in a shorter preset duration for the continued movement; conversely, the lower the current battery level, the slower the rotation speed of the rotating components, and thus the longer the time required to rotate the same angle, resulting in a longer preset duration for the continued movement. Through the aforementioned compensation operation, it is possible to effectively avoid issues such as the knob or door handle being misaligned due to the rotating component not turning into the correct position.

In the examples, after performing a lock opening action or a lock closing action, the lock may experience rotational stuttering or, in severe cases, jamming. This is due to the issue of the lock jamming caused by the gears meshing too tightly. To address this issue, after performing the lock opening or closing action, the controller also controls the drive component to perform a disengagement action (also called a relocking action). For example, referring to FIG. 1, during the process of the drive shaft 12 of the drive component driving the gear rotation, the action of the driving gear teeth 13 engaging with the driven gear teeth 14 can be called engaging. Conversely, based on the reverse rotation of the drive component, the action of separating the driving gear teeth 13 from the driven gear teeth 14 is called disengagement or relocking.

For example, since the rotational speed of rotating components such as motors and gears in the lock is related to the current battery level in the lock, the relocking duration controlled by the drive component in the above relocking is related to the current battery level in the lock. Specifically, the current battery level is negatively correlated with the relocking duration. That is, the higher the current battery level, the faster the rotational speed of the rotating components such as motors and gears in the lock, and therefore the shorter the time required to rotate the same angle, resulting in a shorter relocking duration. Conversely, the lower the current battery level, the slower the rotational speed of the rotating components such as motors and gears in the lock, and therefore the longer the time required to rotate the same angle, resulting in a longer relocking duration.

In the example, referring to FIG. 4, since the knob 16 and the rotating component 10 are relatively stationary, and the trigger component D is fixedly set or arranged on the rotating component 10, as an implementable method, the trigger component D can be fixedly set or arranged at the end of the knob. As a result, when the lock controller determines the signal indicating the unlocking is complete, the user's hand happens to move the rotating knob to point to the first position, thus achieving consistency. Specifically, during the manual locking and unlocking process, the user manually rotates the knob 16. When the user intends to unlock, they rotate the knob 16 towards the direction pointing to the first position. At this time, since the trigger component D can trigger the aforementioned photoelectric sensor B (the first sensing component), a first trigger signal is generated. When the user intends to lock, they rotate the knob 16 towards the direction pointing to the second position. At this time, since the trigger component D can trigger the aforementioned photoelectric sensor A (the second sensing component), a second trigger signal is generated.

In the example, the lock also comprises a third sensing component. The third sensing component is fixedly set or arranged at the third position of the lock, which is located between the aforementioned first position and second position. The third sensing component can include a Hall sensor or a photoelectric sensor. It should be noted that, in the case where the third sensing component adopts a Hall sensor, the aforementioned trigger component needs to be made of a magnetic material. In the following examples, the third sensing component is implemented using a Hall sensor.

Refer to FIG. 4, the Hall sensor C is fixedly installed or arranged at the third position of the lock, which is between the aforementioned first position and second position. Specifically, during the process where the rotating component 10 drives the trigger component D to rotate, when the trigger component D approaches the fixedly installed Hall sensor C, the Hall sensor C generates a detection signal when it senses that the surrounding magnetic field strength exceeds its own threshold. Refer to FIG. 5, the Hall sensor C' is fixedly installed or arranged at the third position of the lock, which is between the aforementioned first position and second position. Specifically, during the process where the rotating component 10 drives the trigger component D' to rotate, when the trigger component D' approaches the fixedly installed Hall sensor C', the Hall sensor C' generates a detection signal when it senses that the surrounding magnetic field strength exceeds its own threshold.

In an example, the controller of the lock can execute an unlocking action or a locking action based on the above detection signals, specifically occurring in the case where the rotating component does not rotate into position. For example, if a user manually rotates the knob to unlock, but does not rotate the knob into the correct position. For example, during the unlocking process, if the final position of the knob does not stop at the first position as shown in FIG. 4 (or during the locking process, the final position of the knob does not stop at the second position as shown in FIG. 4), and the duration of the stop is longer than a preset duration (for example, the preset duration can be set to 20 seconds, but this application does not limit the specific value of the preset duration), it may cause the corresponding photoelectric sensor not to trigger a signal, resulting in the lock status becoming unknown. The aforementioned situation where the rotating component does not rotate into position may occur when a user operates the terminal to remotely lock or unlock, at which time the lock status information obtained by the user's operating terminal is that the lock status is abnormal, which can cause confusion and a sense of insecurity for the user. The aforementioned situation where the rotating component does not rotate into position may also occur in scenarios where the user manually locks or unlocks; the user unconsciously rotates the knob but neither the rotating component nor the knob is rotated into position, or the user deliberately plays with the door handle multiple times and then stops in an intermediate state, etc.

Figure 9:
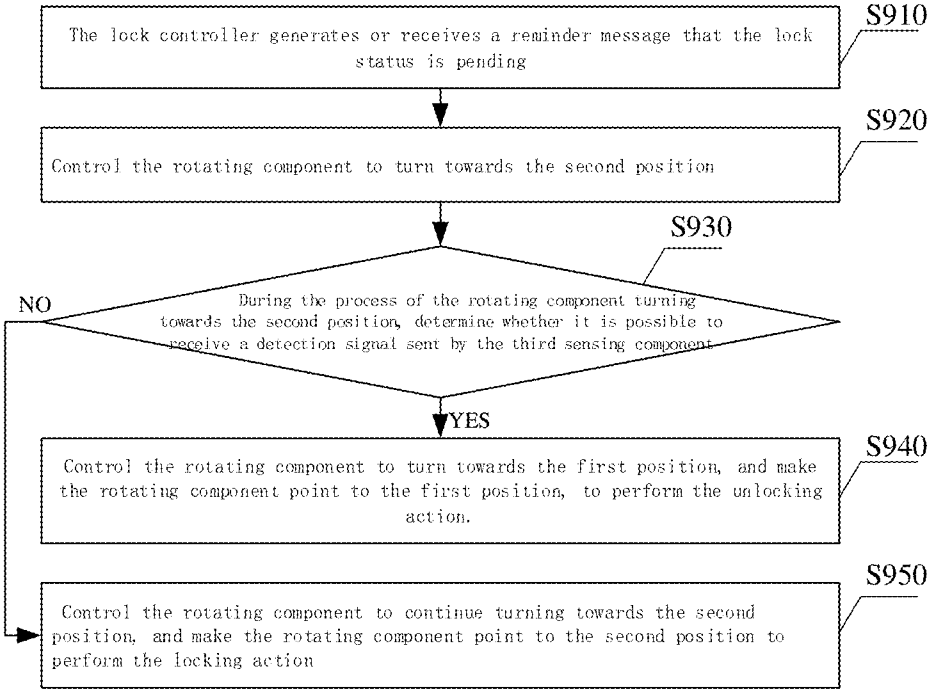
FIG. 9 is a flowchart illustrating a method for controlling the locking and unlocking mechanisms of a lock provided by another example of the present disclosure.

In response to the situation where the rotating component does not rotate into position, the user's control intention of unlocking or locking can be determined based on the aforementioned detection signal. Furthermore, based on the rotating component not reaching its position, the rotation position of the component can be corrected according to the control intention. Specifically, FIG. 9 is a flowchart illustrating the control method for locking and unlocking provided by another example in this disclosure. Referring to FIG. 9, the example shown comprises steps S910-S950.

In step S910, the lock controller generates or receives a reminder message that the lock status is pending.

In one example, the lock controller generates a pending lock status reminder message when it detects that the position of the triggering component does not meet the preset conditions. Here, the aforementioned preset conditions not being met means that the position of the triggering component is neither at the first position nor the second position, thus failing to trigger a signal from either the first sensor or the second sensor. If this state lasts longer than the preset duration, the controller will generate a reminder message that the lock status is pending. For example, referring to FIG. 4, the knob 16, which is fixedly connected to the rotating component, points to a position that does not meet the preset conditions, for example, the triggering component D is neither at the first position nor the second position but is located at some position between the first and second positions and remains there for longer than the preset duration (such as 20 seconds). In such cases where the position of the triggering component does not meet the preset conditions, the lock controller can generate a pending status reminder message. For example, during the remote control process of locking and unlocking, the lock controller can send the pending lock status reminder message as an exception message to the user's operation terminal.

In another example, the user can also send a pending lock status reminder message to the lock controller through the terminal, instructing the lock to self-correct.

Upon the lock controller generating or receiving a reminder message that the lock status is pending, execute S920: Control the rotating component to turn towards the second position.

For example, after the controller generates a reminder message of pending status, for safety reasons, the lock controller controls the rotating component 10 to turn in the locking direction, that is, towards the "second position" as shown in FIG. 4.

In S930, during the process of the rotating component turning towards the second position, determine whether it is possible to receive a detection signal sent by the third sensing component.

For example, referring to FIG. 4, if the triggering component D is currently between the third and first positions, during the process of controlling the rotating component 10 to turn towards the second position, the magnetic triggering component D will pass by the Hall sensor C, thereby triggering the Hall sensor C to generate the aforementioned detection signal. In other words, during the process of the rotating component 10 turning towards the second position, if the detection signal sent by Hall sensor C can be received, it can be explained that before controlling the rotating component to turn towards the second position, the triggering component D was between the third and first positions. Since this position is close to the first position, it can be predicted that the user's control intention is most likely to unlock, then execute S940: Control the rotating component to turn towards the first position, and make the rotating component point to the first position, to perform the unlocking action.

In the event that the lock controller generates or receives a pending lock status notification, execute S920: Control the rotating component to turn towards the second position.

For example, after the controller generates a pending status notification, for safety reasons, the lock controller controls the rotating component 10 to turn in the direction of locking, that is, towards the “second position” as shown in FIG. 4.

In S930, during the process of the rotating component turning towards the second position, it is determined whether a detection signal sent by the third sensing component can be received.

For example, referring to FIG. 4, if the triggering component D is currently between the third and the first positions, during the process of controlling the rotating component 10 to turn towards the second position, the magnetic triggering component D will pass by the Hall sensor C, thereby triggering the Hall sensor C to generate the aforementioned detection signal. This means that during the process of the rotating component 10 turning towards the second position, if the detection signal sent by the Hall sensor C can be received, it can be explained that before controlling the rotating component to turn towards the second position, the triggering component D was between the third and the first positions. Since this position is close to the first position, it can be predicted that the user’s control intention is most likely to unlock, then execute S940: Control the rotating component to turn towards the first position, and make the rotating component point to the first position to perform the unlocking action.

For example, referring to FIG. 4, if the triggering component D is currently between the third and the second positions, during the process of controlling the rotating component 10 to turn towards the second position, the triggering component D will not pass by the Hall sensor C, and thus will not trigger the Hall sensor C to generate the aforementioned detection signal. This means that during the process of the rotating component 10 turning towards the second position, if the detection signal sent by the Hall sensor C cannot be received, it can be explained that before controlling the rotating component to turn towards the second position, the triggering component D was between the third and the second positions. Since this position is close to the second position, it can be predicted that the user’s control intention is most likely to lock, then execute S950: Control the rotating component to continue turning towards the second position, and make the rotating component point to the second position to perform the locking action.

In an example, in order to improve the accuracy of the judgment of the aforementioned user control intention, the third sensing component can be set at a position equidistant from both the first and second positions. For instance, if the first position is at 90 degrees and the second position is at 0 degrees, to enhance the accuracy of the judgment of the user’s control intention, the third sensing component can be set at 45 degrees.

The disclosure relates to predicting the user’s control intent based on the aforementioned target information, and then executing the unlocking action or locking action based on the predicted user intention, so as to cause the rotating component to rotate to the first position corresponding to unlocking, thereby generating unlocking information and reporting it to the user terminal. Alternatively, the controller causes the rotating component to rotate to the second position corresponding to locking, thereby generating locking information and reporting it to the user terminal. Thus, it can effectively enhance the intelligence level of the lock, reduce the user’s sense of insecurity, and improve the user experience.

Figure 10:
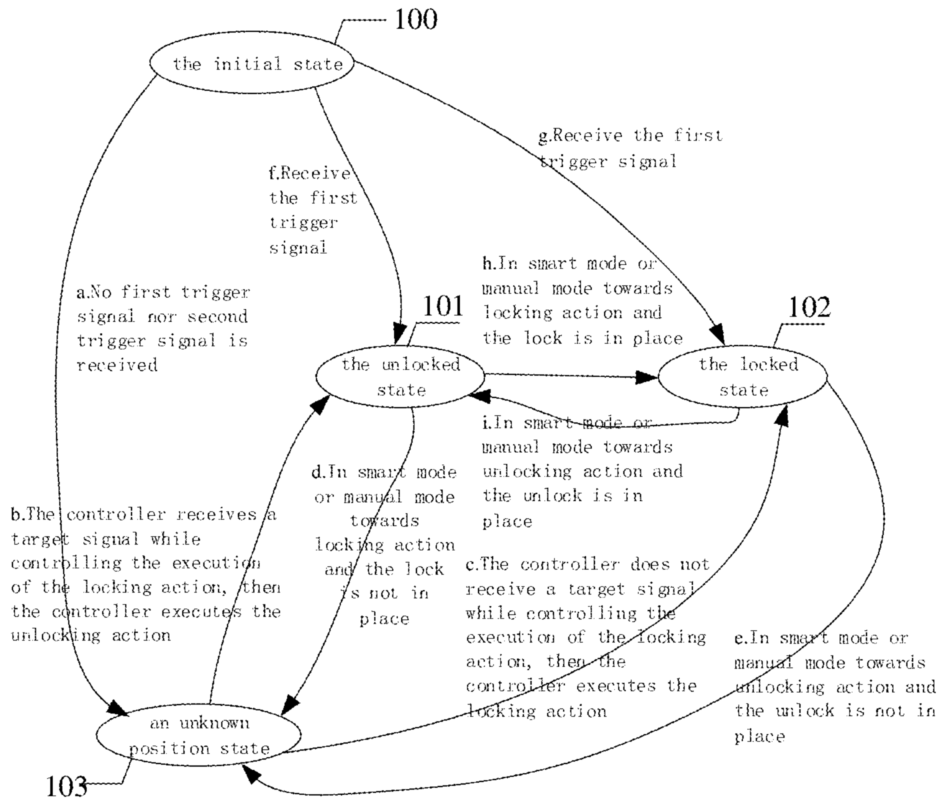
FIG. 10 is a schematic diagram illustrating the relationships between different states of a lock provided by an example of the present disclosure.

In an example, FIG. 10 is a schematic diagram of the relationship between different states of the lock provided by an example of this specification. Referring to FIG. 10, where the initial state 100 can be any state of the lock, for example, it can be an unlocked state, a locked state or an unknown state.

Specifically, under the initial state 100, if the controller does not receive the first trigger signal nor the second trigger signal (situation a) and a preset duration is realized, it indicates that the current rotating component is not in an un-positioned state (i.e., neither the first sensing component nor the second sensing component can detect it), then it can be determined that the rotating component of the lock is in an unknown position, that is, the lock is in an unknown position state 103.

Furthermore, in the unknown position state 103, if the controller receives a detection signal while controlling the execution of the locking action, then the controller executes the unlocking action (situation b), and the lock enters the unlocked state 101. In the unknown position state 103, if the controller does not receive a detection signal while controlling the execution of the locking action, then the controller executes the locking action (situation c), and the lock enters the locked state 102.

Specifically, under the initial state 100, if the controller receives the first trigger signal (situation f), it indicates that the triggering component in the current rotating component is at the first position (i.e., the first sensing component can detect it), then it can be determined that the lock is in the unlocked state 101. Under the initial state 100, if the controller receives the second trigger signal (situation g), it indicates that the triggering component in the current rotating component is at the second position (i.e., the second sensing component can detect it), then it can be determined that the lock is in the locked state 102.

Further, in the unlocked state 101, if in smart mode or manual mode towards locking action and the lock is not in place (situation d), then the lock enters the unknown position state 103. In the unlocked state 101, if in smart mode or manual mode towards locking action and the lock is in place (situation h), then the lock enters the locked state 102.

Further, in the locked state 102, if in smart mode or manual mode towards unlocking action and the unlock is not in place (situation e), then the lock enters the unknown position state 103. In the locked state 102, if in smart mode or manual mode towards unlocking action and the unlock is in place (situation i), then the lock enters the unlocked state 101.

As can be seen from the example shown in FIG. 10, the lock provided in this disclosure can accurately determine the state of the lock, which is beneficial for improving the user experience.

In the example, in addition to executing unlocking or locking actions based on the above detection signals to determine the user’s control intent, the lock controller intelligently switches from low power mode to working mode based on the above detection signals. Specifically, door lock devices are usually powered by batteries, and to save power, when the user does not operate the lock for a certain period of time, such as pressing a fingerprint, touching a button, or remote operation, etc., the lock will automatically enter standby mode (low power mode) to reduce power consumption.

For example, referring to FIG. 4, during the manual unlocking process by the user, by rotating the knob 16 to turn the rotating component 10, when the magnetic material’s trigger part D approaches the Hall sensor C (the third sensing component), the Hall sensor C senses the surrounding magnetic field strength greater than its own threshold and generates the above target information. This detection signal is used to trigger the state of the lock, switching from low power mode to working mode. Specifically, in low power mode, components in the lock that are in a dormant or sleep state (including fingerprint, Light-Emitting Diode (LED), touch Integrated Circuit (IC), etc.) are not powered, and when switched to working mode, the aforementioned components in a dormant or sleep state are powered. In this example, since the magnetic material's trigger part can trigger the above detection signal when approaching the Hall sensor, using the Hall sensor as the third sensing component can promptly wake up the device.

The solution provided by the examples in this disclosure allows for accurate and convenient detection of the lock being properly unlocked based on the first trigger signal generated by the first sensing component, and likewise, accurate and convenient detection of the lock being properly locked based on the second trigger signal generated by the second sensing component. Additionally, to avoid the issue of rotational angle errors when determining the lock position with a photoelectric sensor, the examples in this disclosure also offer angle compensation to ensure that the rotating component is accurately positioned after locking or unlocking.

On the other hand, to address potential issues of the lock becoming stuck or jammed after performing locking or unlocking actions, the examples in this disclosure also provide a re-locking scheme that adjusts the re-locking duration in real-time based on the battery level of the lock. This helps to precisely control the re-locking process and effectively prevent the lock from becoming stuck or jammed.

Furthermore, the examples in this disclosure utilize the detection signal generated by the third sensing component to achieve intelligent device wake-up, which is convenient for users and effectively saves power. The examples also use the detection signal from the third sensing component to accurately predict the user's control intentions. Based on the predicted user intentions, the system performs locking or unlocking actions, causing the rotating component to turn to the first position corresponding to unlocking, thereby generating unlocking information and reporting it to the user terminal, or to the second position corresponding to locking, thereby generating locking information and reporting it to the user terminal. This effectively enhances the intelligence level of the lock, reduces the user's sense of insecurity, and is beneficial in improving the user experience.

This application example also provides a computer-readable storage medium, which stores a computer program that, when executed by a processor (such as the controller in the aforementioned lock), implements the steps of any of the aforementioned example methods. The computer-readable storage medium may include, but is not limited to, any type of disk, including floppy disks, optical disks, DVDs (Digital Video Discs), CD-ROMs (Compact Disc Read-Only Memory), micro-drives, and magneto-optical disks, ROMs (Read-Only Memory), RAMs (Random Access Memory), EPROMs (Erasable Programmable Read-Only Memory), EEPROMs (Electrically Erasable Programmable Read-Only Memory), DRAMs (Dynamic Random Access Memory), VRAMs (Video Random Access Memory), flash memory devices, magnetic cards or optical cards, Nano systems (including molecular memory ICs), or any type of medium or device suitable for storing instructions and/or data.

In the description of this specification, it should be understood that terms such as "first," "second," etc., are used only for descriptive purposes and should not be construed as indicating or implying relative importance. The specific meaning of the above terms in this specification can be understood by those of ordinary skill in the art according to the specific circumstances. Furthermore, in the description of this specification, unless otherwise specified, "multiple" refers to two or more. "And/or" describes the association relationship of associated objects, indicating that there can be three relationships. For example, A and/or B can mean: A exists alone, A and B exist together, or B exists alone. The character "/" generally indicates that the associated objects before and after are in an "or" relationship.

It should be noted that specific examples have been described above for this specification. Other examples are within the scope of the appended claims. In some cases, the actions or steps recorded in the claims can be performed in a different order from that described in the examples and still achieve the desired results. In addition, the processes depicted in the drawings do not necessarily require the specific sequence shown or the continuous sequence to achieve the desired results. In some examples, multitasking and parallel processing may also be possible or advantageous.

As described above, these are only specific examples of this specification, but the scope of protection of this specification is not limited to these. Any person skilled in the art can easily think of changes or substitutions within the technical scope disclosed by this specification, and they should be covered within the scope of protection of this specification. Therefore, equivalent changes made according to the claims of this specification are still within the scope covered by this specification.

What is claimed is:

1. A method for controlling locking and unlocking mechanisms of a lock comprising a controller, a rotating component comprising a triggering component, a first sensor and a second sensor, the method comprising:

- receiving, by the controller, a first triggering signal or a second triggering signal, wherein the first triggering signal is generated by the first sensor when the triggering component is in a first position, and the second triggering signal is generated by the second sensor when the triggering component is in a second position;
- based on the receipt of the first triggering signal, generating a lock opening completion signal, wherein the rotating component is configured to continue rotating a preset angle;
- based on the receipt of the second triggering signal, generating a lock closing completion signal, wherein the rotating component is configured to continue rotating the preset angle; and
- based on a determination that the rotating component is neither at the first position nor at the second position, and a duration of stay of the rotating component is greater than a preset duration, causing the rotating component to rotate towards the second position.

2. The method of claim 1, wherein the lock comprises a third sensor fixedly arranged at a third position of the lock, the third position being between the first position and the second position, the method further comprising:

- receiving, by the controller and from a terminal, a reminder message that a status of the lock is pending;
- wherein causing the rotating component to rotate towards the second position comprises performing any one of:
- based on a determination that the lock is in an undefined state indicating a security risk and the duration of stay is greater than the preset duration, causing the rotating component to rotate towards a locked state;

based on a determination that the lock is in an abnormal stuck state and the duration of stay is greater than the preset duration, causing the rotating component to rotate to release the lock; or based on a determination that the status of the lock indicates continuous battery drain and the duration of stay is greater than the preset duration, causing the rotating component to rotate towards a low power state.

3. The method of claim 2, further comprising:

during the rotation of the rotating component and after receiving, from the third sensor, a detection signal indicating that the third sensor senses the triggering component at the third position, causing, by the controller, the rotating component to rotate towards the first position and to point to the first position to perform an unlocking action.

4. The method of claim 2, further comprising:

during the rotation of the rotating component and after receiving, from the third sensor, a detection signal indicating that the third sensor senses the triggering component at the third position, causing, by the controller, the rotating component to rotate towards the second position and to point to the second position to perform a locking action.

5. The method of claim 2, further comprising:

after receiving, from the third sensor, a detection signal indicating that the third sensor senses the triggering component at the third position, causing, by the controller, the lock to switch from a low power mode to a working mode, wherein:

in the low power mode, one or more components of the lock in a sleep state are not powered, and in the working mode, the one or more components in the sleep state are powered.

6. The method of claim 5, wherein the lock further comprises a driving component connected to the rotating component, and wherein the driving component is electrically connected to the controller.

7. The method of claim 1, further comprising:

after generating the lock opening completion signal and causing the rotating component to continue rotating the preset angle, sending a first notification to a terminal, wherein the first notification indicates a successful unlocking.

8. The method of claim 1, further comprising:

after generating the lock closing completion signal and causing the rotating component to continue rotating the preset angle, sending a second notification a terminal, wherein the second notification indicates a successful locking.

9. The method of claim 1, wherein the lock is in an unlocked state when the triggering component is at the first position, and the lock is in a locked state when the triggering component is at the second position.

10. The method of claim 2, wherein the first sensor and the second sensor comprise photoelectric sensors, the triggering component comprises a light-blocking piece, the third sensor comprises a Hall sensor, and the triggering component comprises a magnetic piece.

11. A lock comprising:

a controller, a rotating component comprising a triggering component, a first sensor, and a second sensor, wherein the controller is configured to:

receive a first triggering signal or a second triggering signal, wherein the first triggering signal is generated by the first sensor when the triggering component is in a first position, and the second triggering signal is generated by the second sensor when the triggering component is in a second position;

based on the receipt of the first triggering signal, generate a lock opening completion signal, wherein the rotating component is configured to continue rotating a preset angle; and based on the receipt of the second triggering signal, generate a lock closing completion signal, wherein the rotating component is configured to continue rotating the preset angle; and based on a determination that the rotating component is neither at the first position nor at the second position, and a duration of stay of the rotating component is greater than a preset duration, causing the rotating component to rotate towards the second position.

12. The lock of claim 11, further comprises a third sensor fixedly arranged at a third position of the lock, the third position being between the first position and the second position, wherein the controller is further configured to:

receive, from a terminal, a reminder message that a status of the lock is pending; and cause the rotating component to rotate towards the second position by performing any one of:

based on a determination that the lock is in an undefined state indicating a security risk and the duration of stay is greater than the preset duration, causing the rotating component to rotate towards a locked state;

based on a determination that the lock is in an abnormal stuck state and the duration of stay is greater than the preset duration, causing the rotating component to rotate to release the lock; or based on a determination that the status of the lock indicates continuous battery drain and the duration of stay is greater than the preset duration, causing the rotating component to rotate towards a low power state.

13. The lock of claim 12, wherein the controller is further configured to:

during the rotation of the rotating component and after receiving, from the third sensor, a detection signal indicating that the third sensor senses the triggering component at the third position, cause the rotating component to rotate towards the first position and to point to the first position to perform an unlocking action.

14. The lock of claim 12, wherein the controller is further configured to:

during the rotation of the rotating component and after receiving, from the third sensor, a detection signal indicating that the third sensor senses the triggering component at the third position, cause the rotating component to rotate towards the second position and to point to the second position to perform a locking action.

15. The lock of claim 12, wherein the controller is further configured to:

after receiving, from the third sensor, a detection signal indicating that the third sensor senses the triggering component at the third position, cause the lock to switch from a low power mode to a working mode, wherein:

in the low power mode, one or more components of the lock in a sleep state are not powered, and in the working mode, the one or more components in the sleep state are powered.

16. The lock of claim 11, further comprising a driving component connected to the rotating component, and wherein the driving component is electrically connected to the controller.

17. The lock of claim 11, wherein the controller is further configured to:

after generating the lock opening completion signal and causing the rotating component to continue rotating the preset angle, send a first notification to a terminal, wherein the first notification indicates a successful unlocking.

18. The lock of claim 11, wherein the controller is further configured to after generating the lock closing completion signal and causing the rotating component to continue rotating the preset angle, send a second notification a terminal, wherein the second notification indicates a successful locking.

19. The lock of claim 11, wherein the lock is in an unlocked state when the triggering component is at the first position, and the lock is in a locked state when the triggering component is at the second position.

20. The lock of claim 12, wherein the first sensor and the second sensor comprise photoelectric sensors, the triggering component comprises a light-blocking piece, the third sensor comprises a Hall sensor, and the triggering component comprises a magnetic piece.

* * * * *